United States Patent
Miller et al.

(10) Patent No.: US 11,144,932 B2
(45) Date of Patent: Oct. 12, 2021

(54) SYSTEM AND METHOD FOR PROVIDING CONTINUED ACCESS TO USER RELATED INFORMATION

(75) Inventors: Paul Miller, Lake Forest, IL (US); Jason Brownewell, Lake Forest, IL (US); Rosa Manfredi, Mundelein, IL (US); Geoffry A. Westphal, Evanston, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 1782 days.

(21) Appl. No.: 13/286,594

(22) Filed: Nov. 1, 2011

(65) Prior Publication Data
US 2013/0111316 A1 May 2, 2013

Related U.S. Application Data

(63) Continuation of application No. 13/284,391, filed on Oct. 28, 2011, now abandoned.

(51) Int. Cl.
*G06F 16/954* (2019.01)
*G06Q 30/02* (2012.01)
*G06F 16/957* (2019.01)
*G06F 16/958* (2019.01)

(52) U.S. Cl.
CPC .......... *G06Q 30/02* (2013.01); *G06F 16/954* (2019.01); *G06F 16/958* (2019.01); *G06F 16/9577* (2019.01)

(58) Field of Classification Search
CPC .......... G06F 16/95; G06F 16/94; G05F 40/10
See application file for complete search history.

(56) References Cited

U.S. PATENT DOCUMENTS

| | | | |
|---|---|---|---|
| 7,792,889 B1* | 9/2010 | Lee et al. | 707/948 |
| 8,473,316 B1* | 6/2013 | Panzitta et al. | 705/7.11 |
| 8,473,834 B1* | 6/2013 | Hoyt | G06F 17/3089 715/202 |
| 2002/0069096 A1* | 6/2002 | Lindoerfer et al. | 705/7 |
| 2002/0077916 A1* | 6/2002 | Greene | 705/26 |
| 2002/0178077 A1* | 11/2002 | Katz et al. | 705/26 |
| 2006/0259367 A1* | 11/2006 | Sattler | G06F 21/31 705/26.35 |
| 2007/0094267 A1* | 4/2007 | Good | G06F 17/30873 |
| 2009/0077500 A1* | 3/2009 | Perrin | G06F 17/30873 715/835 |
| 2011/0161182 A1* | 6/2011 | Racco | 705/14.73 |
| 2012/0159294 A1* | 6/2012 | Gonsalves | G06F 17/30873 715/205 |
| 2012/0185921 A1* | 7/2012 | Wechsler et al. | 726/4 |

OTHER PUBLICATIONS

"Network Solutions: Customizing your Site Navigation", referred to as NavRef in the Office Action, retrieved from https://web.archive.org/web/20111001030935/http://www.networksolutions.com/support/customizing-your-site-navigation/.*

(Continued)

*Primary Examiner* — Sanchita Roy
(74) *Attorney, Agent, or Firm* — Greenberg Traurig, LLP

(57) ABSTRACT

An account ribbon of a website has a plurality of message fields each having a link activatable to cause a display of a type of user related information. Continued access to the user related is provided by causing the account ribbon to be persisted across plural webpages of the website.

16 Claims, 7 Drawing Sheets

(56) References Cited

OTHER PUBLICATIONS

"asp.net Forums: Role Based Menu", referred to as RoleRef in the Office Action, retrieved from http://forums.asp.net/t/1726754.aspx?Role+based+Menu.*

Network Solutions: Customizing your Site Navigations, referred to as NavRef in the Office Action, retrieved from https://web.archive.org/web/20110521161536/http://www.networksolutions.com/support/customizing-your-site-navigation/. (Different date from the reference cited in the prior Office Action).*

"4GuysFromRolla.com: Examining asp.net 2.0's Site Navigation—Part 1", published Nov. 16, 2005 and retrieved from http://www.4guysfromrolla.com/articles/111605-1.aspx (Year: 2005).*

\* cited by examiner

| Mode / Event Class Examples | Online | Offline |
|---|---|---|
| Search | Keywords, categories, model numbers, catalog pages, personal lists | Catalog index search |
| Finance | Online payment | Traditional payment |
| Product | Placed in shopping cart, generate pick ticket, place order, create personal list | Product picked, shipped, returned |
| Order | Placed, cancelled, status checked | Shipped, received, (meta: damaged) |
| Communication (phone, fax, email) | Vendor email/fax parts diagram, customer click-to-chat, emails, emails to/from tech support | Rep visit in person, sales call by phone, follow-up call, call to customer support |
| Marketing | Product recommendation, promotions | Fliers, catalogs |

FIG. 6

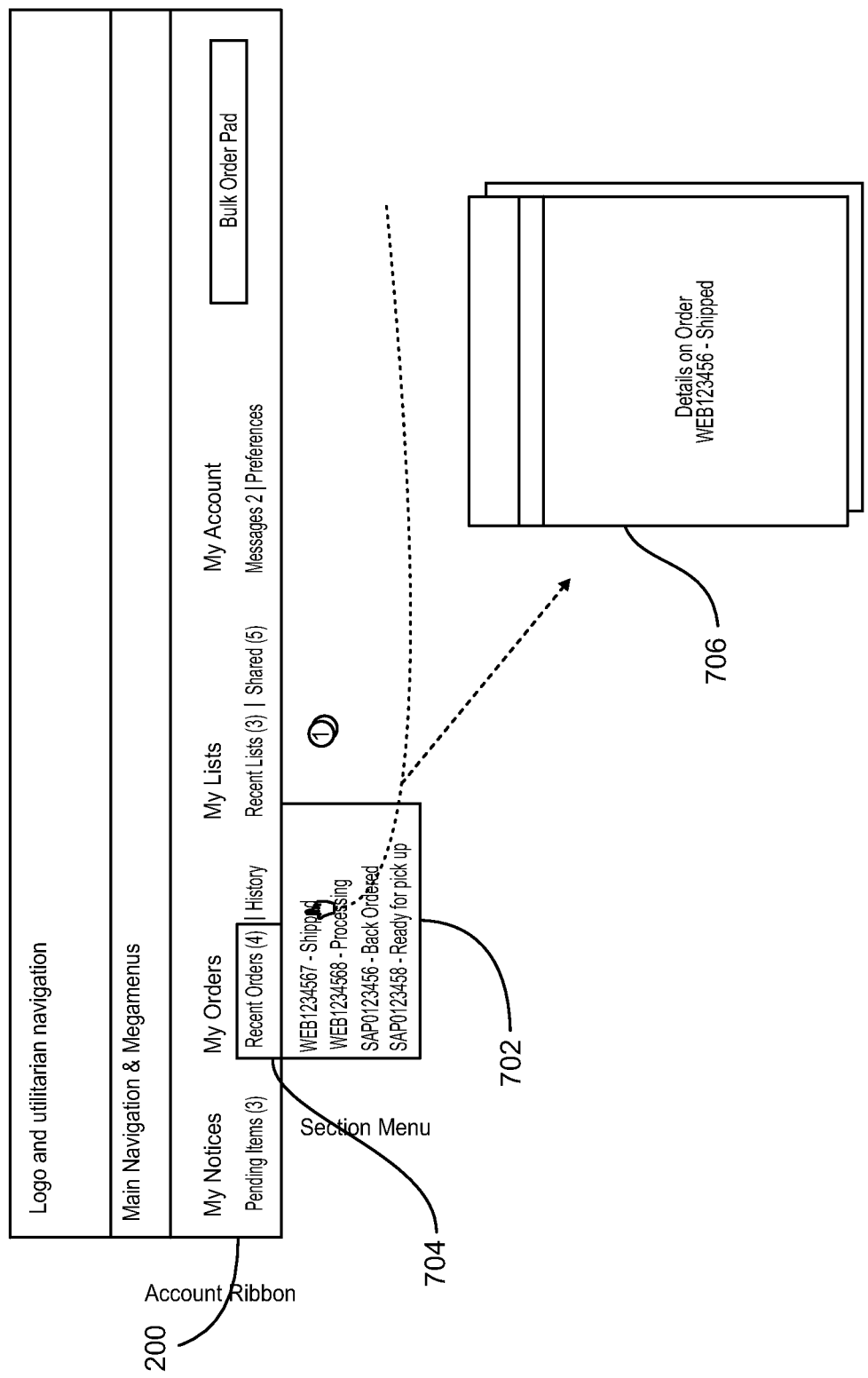

SYSTEM AND METHOD FOR PROVIDING CONTINUED ACCESS TO USER RELATED INFORMATION

BACKGROUND

The subject disclosure generally relates to electronic commerce and, more particularly, to a system and method for providing continued access to user related information in an electronic commerce environment.

In the art, it is generally known to include within an e-commerce website, comprised of a plurality of webpages, a plurality of links each of which is selectable to provide a user with access to a corresponding type of user related information. By way of example, such links may be used to provide a user with access to a customer shopping cart, emails, reservations, loyalty awards, order history, or the like. However, in currently implemented e-commerce websites, the various links which are used to provide access to the various different types of user related information are scattered throughout the e-commerce website. Accordingly, if a user desires to access a particular type of user related information, the user must hunt through the various webpages of the website to locate the link that corresponds thereto.

SUMMARY OF THE INVENTION

The following generally describes a system and method for providing continued access to user related information in an electronic commerce environment. More particularly, an account ribbon of a website has a plurality of message fields each having a link activatable to cause a display of a type of user related information. Continued access to the user related information is provided by causing the account ribbon to be persisted across plural webpages of the website. The information that is caused to be displayed in response to a user interacting with a link of the account ribbon may be temporally organized.

While the forgoing provides a general explanation of the subject invention, a better understanding of the objects, advantages, features, properties and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to preferred embodiments shown in the attached drawings in which:

FIG. 6 illustrates a matrix by which metadata associated with events may be captured; and FIG. 7 illustrates an exemplary method for accessing information via a message field on an "account ribbon."

DETAILED DESCRIPTION

Figure 1:
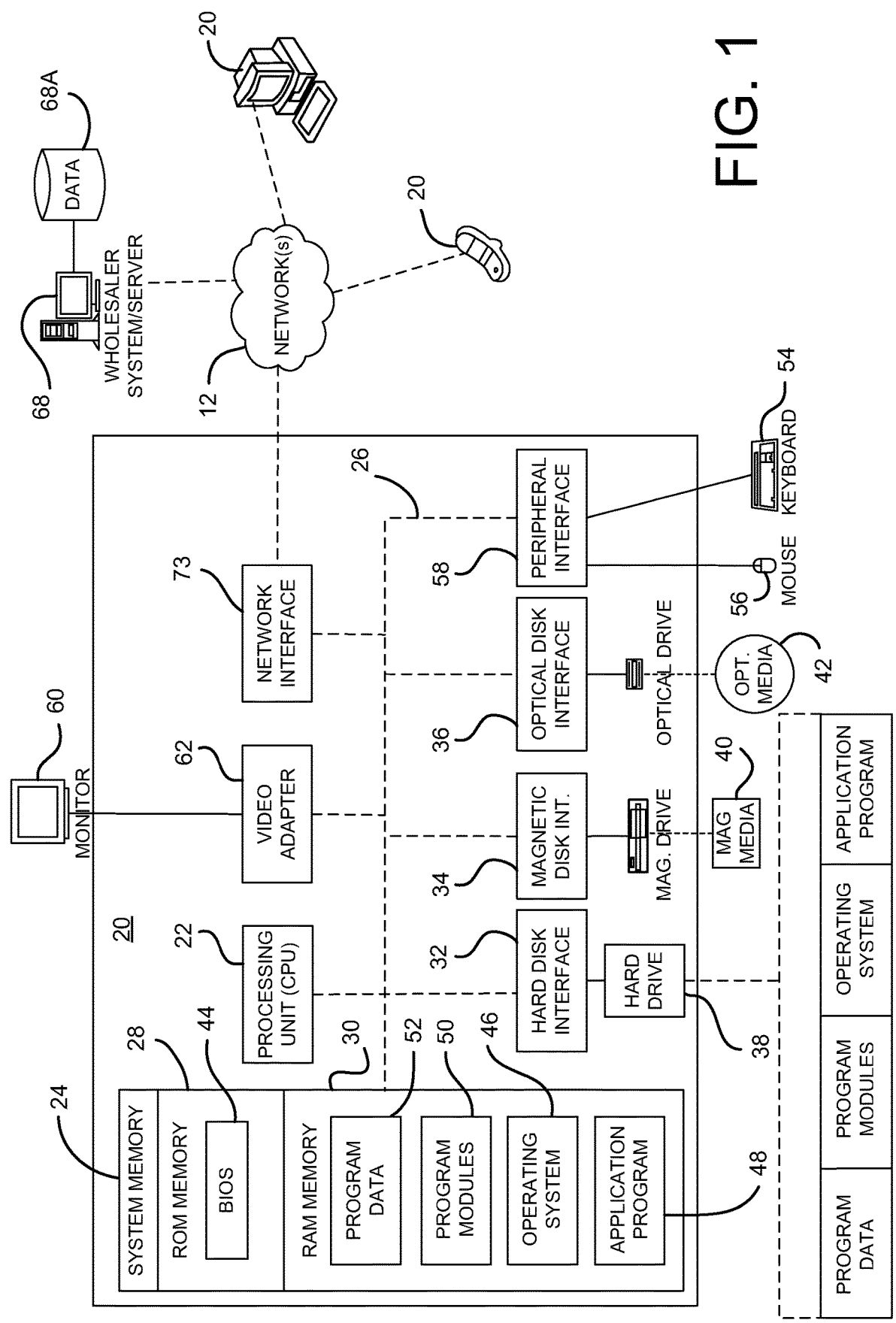
FIG. 1 is a block diagram illustrating components of an exemplary network system in which the subject method may be employed.

With reference to the figures, a system and method is hereinafter described for providing continued access to user related information in an electronic commerce environment, which information, when accessed, can be temporally organized and/or displayed using predetermined priorities. While not intended to be limiting, the system and method will be described in the context of a plurality of processing devices linked via a network, such as a local area network or a wide area network, as illustrated in FIG. 1. In this regard, a processing device 20, illustrated in the exemplary form of a computer system, is provided with executable instructions to, for example, provide a means for a user, e.g., a customer, or a sales representative acting on behalf of the user, to access a remote processing device, e.g., a server system 68, via the network to, among other things, interact with an e-commerce website comprised of a plurality of webpages. Generally, the computer executable instructions reside in program modules which may include routines, programs, objects, components, data structures, etc. that perform particular tasks or implement particular abstract data types. Accordingly, those skilled in the art will appreciate that the processing device 20 may be embodied in any device having the ability to execute instructions such as, by way of example, a personal computer, mainframe computer, personal-digital assistant ("PDA"), cellular or smart telephone, tablet computer, or the like. Furthermore, while described and illustrated in the context of a single processing device 20, those skilled in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated non-transient, computer-readable media allow for the non-volatile storage of computer readable instructions, data structures, program modules and other data for the processing device 20. Those skilled in the art will further appreciate that other types of non-transient, computer readable media that can store data may be used for this same purpose. Examples of such media devices include, but are not limited to, magnetic cassettes, flash memory cards, digital videodisks, Bernoulli cartridges, random access memories, nanodrives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example, via a network connection.

The user may interact with content provided by the website (e.g., click on displayed links), enter commands and information into the processing device 20 (e.g., provide a search query), etc. through input devices such as a touch screen or keyboard 54, a pointing device 56, and/or a gesture receiving device (not shown). While not illustrated, other input devices may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

The processing device 20 may also utilize logical connections to one or more remote processing devices, such as the server system 68 having one or more associated data repositories 68A. In the e-commerce environment, the data repositories 68A store the information that is utilized to generate the webpages, product information, user related information, etc. In this regard, while the server system 68 has been illustrated in the exemplary form of a computer, it will be appreciated that the server system 68 may, like processing device 20, be any type of device having processing capabilities. Again, it will be appreciated that the server system 68 need not be implemented as a single device but may be implemented in a manner such that the tasks performed by the server system 68 are distributed to a plurality of processing devices linked through a communication network. Additionally, the server system 68 may have logical connections to other third party server systems, such as those of financial institutions, shipping and delivery institutions, third party vendors, etc., via the network 12 and, via such connections, will be associated with data repositories that are associated with such other third party server systems.

For performing tasks as needed, the server system 68 may include many or all of the elements described above relative to the processing device 20. By way of further example, the server system 68 includes executable instructions stored on a non-transient memory device for, among other things, presenting webpages, handling search requests, providing search results, providing access to context related services, sending emails, managing lists, managing shopping carts, presenting requested user specific information, etc. Communications between the processing device 20 and the server system 68 may be exchanged via a further processing device, such as a network router, that is responsible for network routing. Communications with the network router may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) of the server system 68. Additionally, it will be understood that, in certain circumstances, various of the application and/or data utilized by the system server 68 and/or computing device 20 may reside in the "cloud."

To provide access to user related information, the webpages presented by the server system 68 utilize an "account ribbon" 200 in which is included a plurality of message fields which may further include links, e.g., links 202, 204, 206, and 208. In a conventional manner, the links can be interacted with by a user to thereby cause the server system 68 to present corresponding user related information. By way of non-limiting example, the user related information that can be accessed by the user interacting with links could include user created lists, such as product lists, personnel lists, etc., user order history information, such as prior orders, pending orders, etc., user alerts, user preferences, and/or the like. The information that is made available to the user in this manner may include information that is related to the user personally (e.g., created by or provided for the user) and/or information that is related to the user via their membership in a group, e.g., an enterprise account with a vendor.

Figure 2:
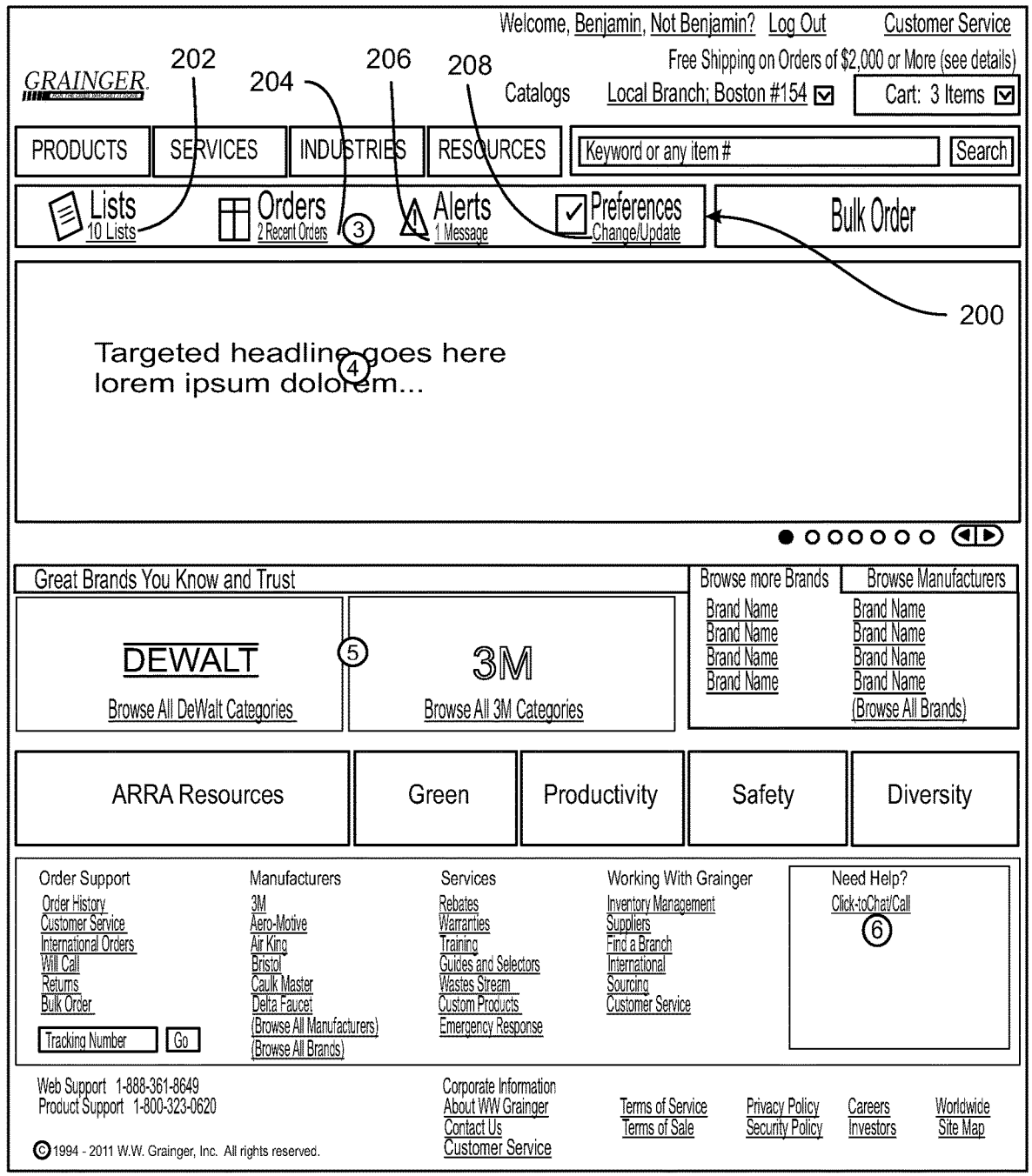
FIG. 2 illustrates an exemplary webpage of a website carrying an account ribbon by which continued access to use related information is provided throughout the website.

More particularly, when one of the links presented in the "account ribbon" 200 is activated by a user, e.g., clicked upon, or moused over, the data repositories 68A will be accessed in real-time, considering information indicative of the user, to thereby extract from the data repositories 68A the information that corresponds to the selected link 202, 204, 206, and 208. The user related information accessed in this manner from the data repositories 68A may then be presented to the user in a further webpage, in a modal associated with a currently displayed webpage, and the like without limitation. By way of further example, FIG. 7 illustrates a menu 702 being presented to a user in response to the user mousing over the "recent orders" 704 link in the message field whereupon the user may then interact with the items within the menu 702, e.g., by clicking on, mousing over, etc. the four links presented—corresponding to the (4) recent orders of which the user was informed via the link related information, to thereby cause further related information to be presented to the user in modal 706, e.g., the recent order information for the customer which information is retrieved from the data repository in real time. As also illustrated in FIG. 7, one or more of the message fields may have plural related links, e.g., activatable links "recent orders" and "history" in the "My Orders" message field. When such user related information is presented to the user, the user may edit the presented information, use the information to access still further information (e.g., the information is shown in the form of links), etc. as will be described in greater detail hereinafter. Because the user is known to the system server 68, e.g., the user has logged into the system, the "account ribbon" 200 may present additional user related information in association with the links 202, 204, 206, and 208 as additionally illustrated in FIG. 2, e.g., to indicate a number of created lists which can be accessed via an activation of the "lists" link 202, indicate a number of alert messages which can be accessed via an activation of the "alerts" link 206, etc.

In the event that an unknown user accesses the website, the system may present in one or more of the webpages a link 300 which the user may activate to cause the system server 68 to present one or more fields by which the user is to provide to the system server 68 their log-in information. In the illustrative example, the user may provide their log-in information, e.g., a user name and password pair, by entering the same into fields presented in a log-in modal window 302. The system server 68 will verify the information provided during the log-in process against user information maintained in the data repositories 68A. When the user provides recognized log-in information, whether a user name/password pair or other identifying data, the system server 68 will populate one or more of the message fields of the "account ribbon" 200 with the links to information that are appropriate for that user which links may be associated with still further user specific information as described above.

In practice, the "account ribbon" 200, which is persisted across the webpages of the website preferably at or near the top thereof, functions to provided continued access to customer messages and/or to customer related information that is linked to within the "account ribbon" 200. More particularly, the "account ribbon" 200 is desired to present to the user messages and links that will function to briefly inform a logged-in user about account changes or statuses to thereby help the user make decisions and/or take care of any actions that may require attention. To this end, the messages and corresponding links that are presented to a logged-in user may be varied depending upon, by way of example only, an indicated role of a user within a group, e.g., within an enterprise account. For example, a full-rights user within an enterprise account, e.g., a user that would be primarily concerned with administering/managing the account, and a limited-rights user of the enterprise account, e.g., a user primarily tasked with buying product and/or services via the website, may have presented in their "account ribbon" 200 messages and/or links that are the most appropriate for the given role of that user.

Figure 3:
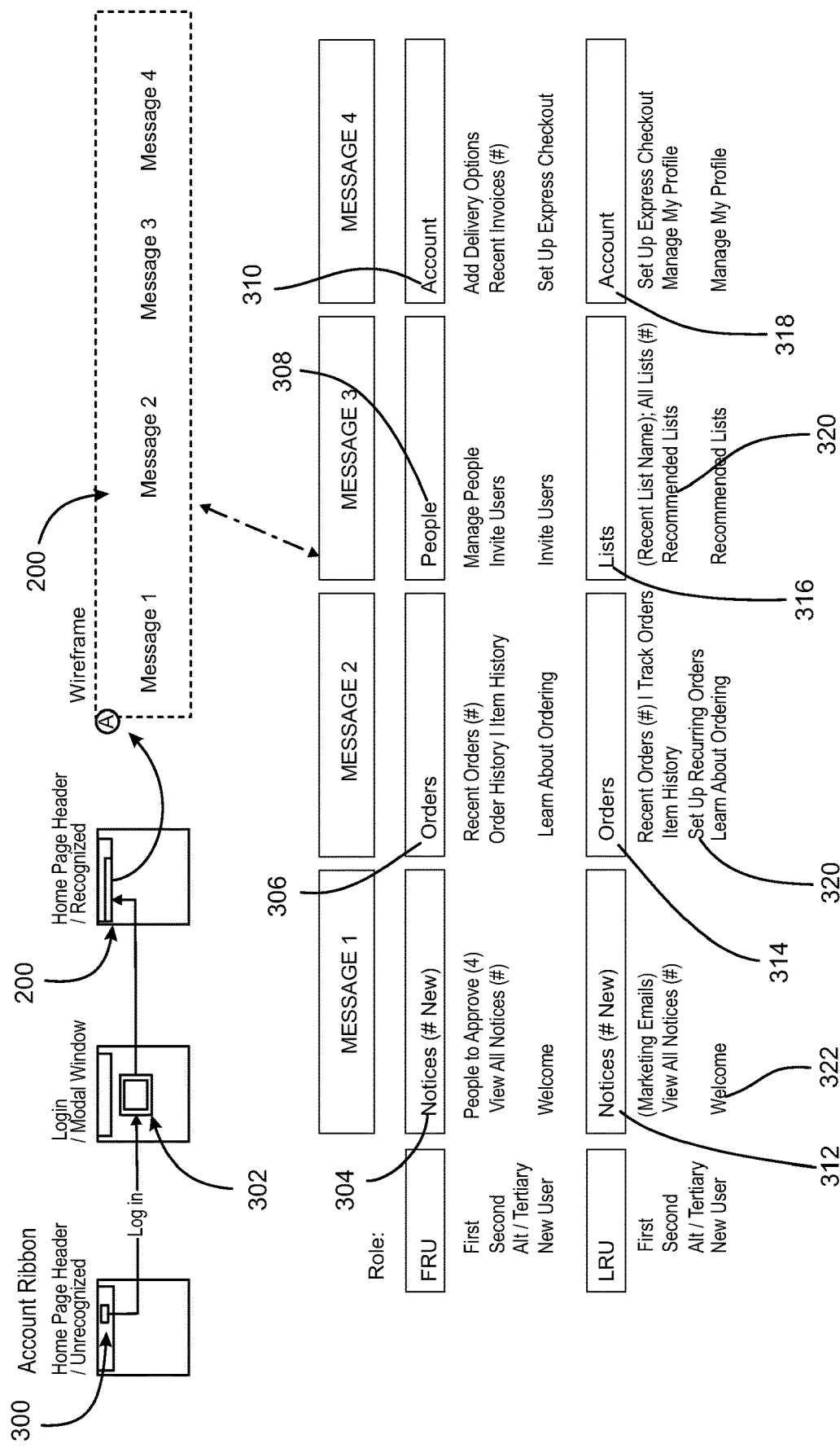
FIG. 3 illustrates an exemplary flow diagram by which message fields of the account ribbon are populated considering a characteristic of a user.

In keeping with this example, the messages in the "account ribbon" 200 for a full-rights user might include, as further shown in FIG. 3, a "notices" link 304 in message field 1 of the "account ribbon" 200 (which link 304 is associated with related information indicating the number of messages to be accessed via activation of link 304), an "orders" link 306 in message field 2 of the "account ribbon" 200 (which link 306 is activatable to present a listing of user and/or group order related information), a "people" link 308 in message field 3 of the "account ribbon" 200 (which link 308 is activatable to present a listing of group personnel information), and an "account" link 310 in message field 4 of the "account ribbon" 200 (which link is activatable to present a listing of user and/or group account related information). Meanwhile, if the server system 68 recognizes the currently logged-in user as a limited-rights user, the "account ribbon" 200 is modified to present messages appropriate for that role within the enterprise. As further shown by the exemplary account ribbons 200 depicted in FIG. 3, an "account ribbon" 200 for a limited-rights user might include a "notices" link 312 in message field 1 of the "account ribbon" 200 (which link 312 is associated with related information indicating the number of messages to be accessed via activation of link 312—which information is to be updateable in near real-time while the "account ribbon" is displayed), an "orders" link 314 in message field 2 of the "account ribbon" 200 (which link 314 is activatable to present a listing of user order related information), a "lists" link 316 in message field 3 of the "account ribbon" 200 (which link 316 is activatable to present a listing of user and/or group created lists), and an "account" link 318 in message field 4 of the "account ribbon" 200 (which link is activatable to present a listing of user account related information).

Figure 4:
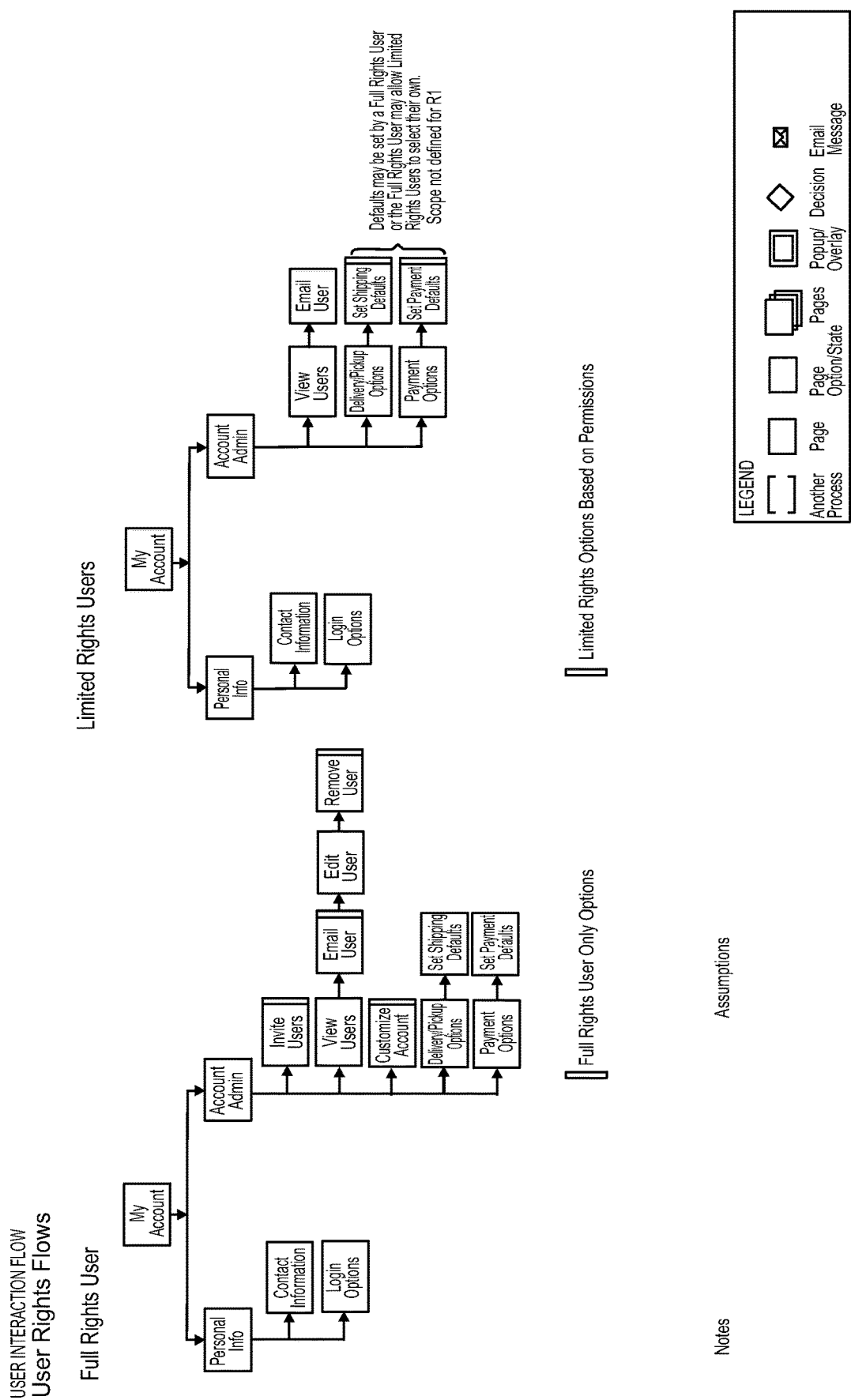
FIG. 4 illustrates exemplary user interaction flows wherein the information that is made available to a user is determined considering a characteristic of the user.

As additionally shown in FIGS. 3 and 4, the information that will be made accessible to the various users, i.e., presented in response to activation of a corresponding one of the links shown in their "account ribbon" 200, will likewise be dependent upon their given role within a group, e.g., the enterprise account. For example, because the full-rights user is primarily concerned with administering/managing the account, a full-rights user may be provided with the ability to access information that is user specific as well as group specific, e.g., information which is more pertinent to their role as an administrator for the enterprise account. By way of example, such a full-rights user might be provided with access to information that would allow the full-rights user to view, edit, and/or otherwise manage personnel, orders, preferences and/or the like associated with the enterprise account as well as their own information. Meanwhile, because the limited-rights user is primarily tasked with buying product and/or services via the website, such a limited-rights user might be provided with access to information that is user-specific and/or which is also specific to their role as a purchasing agent for the enterprise account. By way of continued example, such a limited-rights user might be provided with access to information that would allow the limited-rights user to view, edit, and/or otherwise manage emails, ordering histories, created purchasing lists, account preferences, and/or the like associated with their portion of the enterprise account. It will be appreciated, however, that the various messages, links, and information to be accessed via such links via use of the "account ribbon" 200 may be varied as desired and, as such, the examples shown in FIG. 3 are not intended to be limiting in any manner. To further illustrate how a full-rights user and a limited-rights user might be provided with access to differing categories/subcategories of account related information via their respectively provided "account ribbons," FIG. 4 illustrates an exemplary interaction flow for the two different category of users in keeping with the enterprise account example set forth herein.

As noted above, a user can access desired user related information by interacting with a corresponding link that is included in a message field of the "account ribbon" 200. As further illustrated in FIG. 3, the system server 68 will generally respond to the activation of a link that is included within a message field of the "account ribbon" 200 by providing to the user a listing of additional links, e.g., links 320, by which the user can access still further information, e.g., subcategories, related to the general category of information that corresponds to an activated link. In certain embodiments, the links 320 to subcategory information are presented in a predetermined order based upon perceived importance to the user and their role within the enterprise account. In addition, for one or more of an anonymous user, a first time user, newer user, user within a newly created group, etc. the links 320 to subcategory information can be replaced with (or supplemented with) one or more links 322 by which the user can access tutorial information, such as videos, help messages, FAQs, etc., that are related to the tasks associated with the various message fields of the "account ribbon."

While the above describes examples wherein the information contained within the "account ribbon" 200 is defined by considering information that is associated with a user, e.g., their role, it will also be appreciated that an editable "account ribbon" can be provided to thereby allow users to customize the "account ribbon" to thereby have access to their most desired information.

Figure 5:
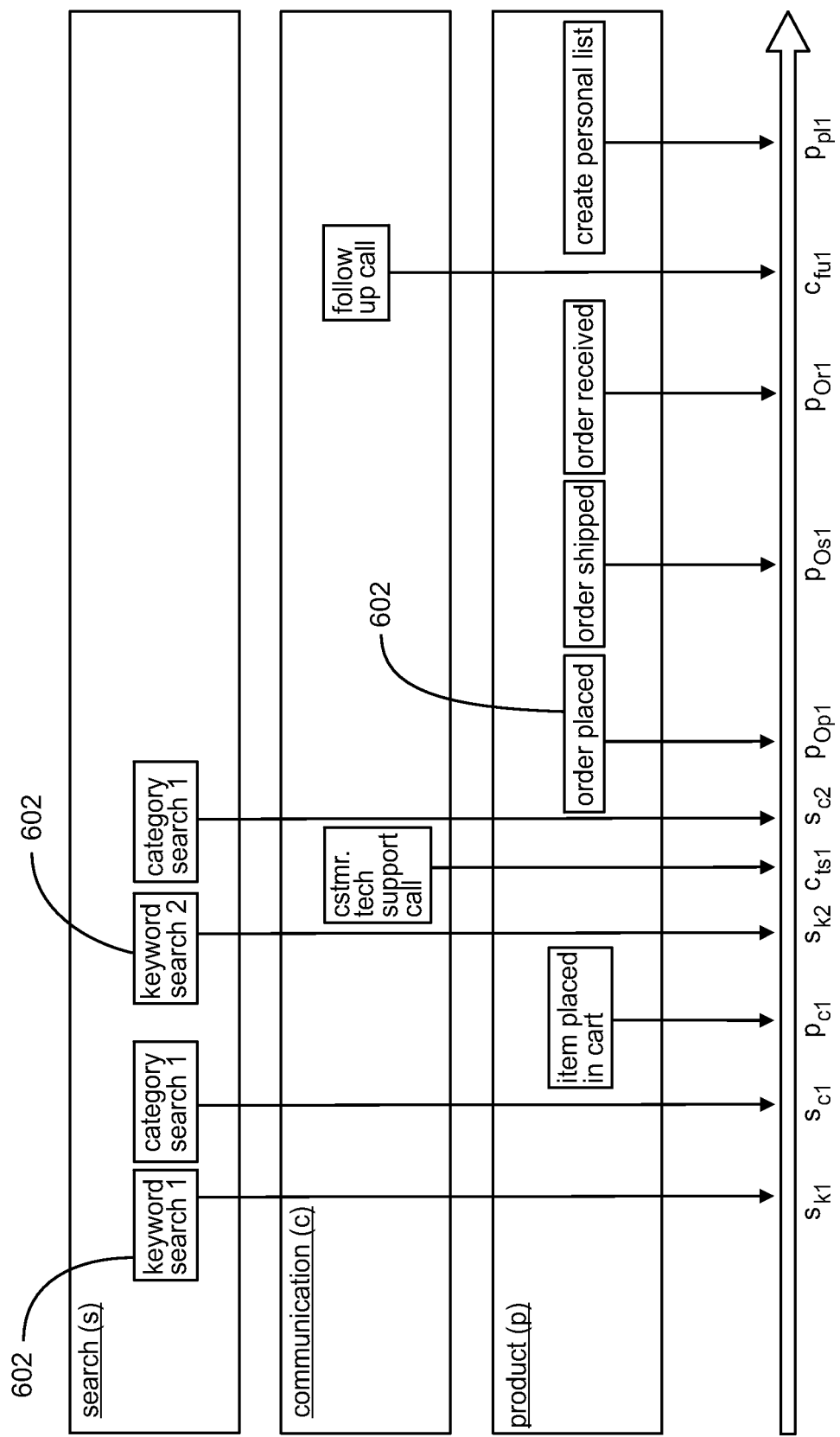
FIG. 5 illustrates an exemplary method for displaying information with temporal ordering.

The "account ribbon" 200 provides a single interface, which is persisted throughout the website, whereby a user can interact with and assimilate relevant information, e.g., the user's current state-of-affairs with a vendor, i.e., host of the system server 68. In certain embodiments, the "account ribbon" 200 may be further utilized to provide a user with access to information that is temporally organized. For example, one or more links could be provided to the "account ribbon" 200 whereby a user is able to access user related, event information which is ordered by time or otherwise attached to a timeline as shown by way of example in FIG. 5 Such user related, event information may be event information that is personal to the user and/or related to the user via their membership in a group as discussed above. In either instance, as further shown in FIG. 6, the events within the various channels, e.g., search channel, communications channel, and purchasing channel, can be user initiated events, vendor initiated events, and even third party initiated events. As also shown in FIG. 6, the events within the various channels could be indicative of actions performed in an online mode and an offline mode. The details of the recorded events, e.g., results of the keyword search 1, a list of items placed in a shopping cart, etc., may be presented to the user in response to the user interacting with the event titles 602 as shown in timeline event aggregation. In the case of audio or video related events, e.g., a call placed to a customer service representative, the event details could include a replaying of the event as recorded. Interaction with the event titles 602 can include a user mousing over an event title 602, clicking on an event title 602, and the like.

In certain circumstances, event titles 602 can be added to the temporally organized listing of information so as to better reflect how the event relates to other events that have been captured for the user. By way of example, an event title indicative of a user downloading a parts manual for a previously purchased product could be placed in a temporally organized list (or on the timeline) next to an event title indicative of the user purchasing the product instead of being placed in a location that corresponds to a time that the product manual was actually downloaded. Furthermore, certain event titles could be placed in the temporally organized list in multiple locations to better assist the user in accessing all information related to a given event. By way of further example, an event title indicative of the user talking with a technical support operator could be placed in a temporally organized list (or on the timeline) at a location that corresponds to a time that the conversation occurred as well as next to an event title indicative of the user purchasing the product which relates to the conversation. As will be appreciated, by use of such a method, events can be aggregated, documented, and recorded in a logical manner to thereby create for the user a better experience whereby the user can simply access all information about products and/or user needs as desired. In such a system, event titles could be organized and displayed in connection with individual channels and/or displayed in a temporal manner without being assigned to any particular channel without limitation.

To further improve the usability of such a system, when events are recorded additional metadata about the events may also be captured and stored in the data repositories 68A. This metadata may then be made available to a search engine and thereby be used itself as a means for aggregation. By way of example, if a user searches for, compares search results, and then buys a generator, metadata about these events could be captured. Such metadata might include one or more of user name data, products viewed data, product categories visited data, keywords used data, brand names used data, pages visited data, links activated data, lists interacted with data, finance related data, time and date data, as well as data indicative of any customer comments that were provided by the user (or captured from the user during a phone call, online chat, etc.) during the events (e.g., data indicative of a building the generator is to be used in, data indicative of purchase authorizer, data indicative of a project name, etc.). The search engine may then be utilized to search against the captured metadata to thereby cause a logically organized list to be displayed with only those event titles that match the provided search criteria.

While various concepts have been described in detail, it will be appreciated by those skilled in the art that various modifications and alternatives to those concepts could be developed in light of the overall teachings of the disclosure. For example, while the above describes an exemplary embodiment wherein user related information is presented considering a "role" characteristic of a user, the system could equally utilize a geographic characteristic of a user. The user's geographic characteristic could be obtained during the log-in process or can be determined dynamically considering a current location of the user, e.g., obtained by determining the location of a device which is being used to access the server system 68 using GPS, network signals, and/or the like. In this manner, the characteristic could be used to present messages/links within an "account ribbon" that are related to the user's location, e.g., weather related, disaster preparedness related, etc. Yet further, while some examples of user/group related information was noted above, such user/group related information could also include product reviews provided by members of the group, product recommendations provided by members of the group, past purchasing histories of members of the group, and the like without limitation. Still further, while various aspects of this invention have been described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A non-transitory computer-readable medium having stored thereon computer executable instructions that, when executed by a processor, cause the processor to perform steps comprising:

causing an account ribbon, having a plurality of message fields each having a unique link selected from a predetermined plurality of links, to be persisted across a plurality of webpages of a website as a component part of a graphical user interface that is provided by each of the plural webpages, wherein each of the unique links is also persisted with the account ribbon across the plurality of webpages of the website, wherein each of the unique links is activatable to cause a display of a menu having at least one menu link, wherein each menu link is activatable to access a type of user related information, wherein the unique links are selected from the predetermined plurality of links when a first one of the plural webpages of the website is caused to be presented to a user that has logged into the website, wherein the type of user related information that is accessible via activation of a one of the menu links is determined when each of the unique links is activated, and wherein the unique links are selected and the menu items are determined considering at least one characteristic of the user.

2. The non-transitory computer-readable medium as recited in claim 1, wherein the at least one characteristic of the user comprises a user role within a group.

3. The non-transitory computer-readable medium as recited in claim 2, wherein the at least one characteristic of the user comprises a user role within an enterprise account with a vendor.

4. The non-transitory computer-readable medium as recited in claim 1, wherein the user related information is made accessible by being displayed in a further webpage of the website.

5. The non-transitory computer-readable medium as recited in claim 4, wherein the user related information comprises additional links which are activatable to cause a display of a sub-type of user related information.

6. The non-transitory computer-readable medium as recited in claim 1, wherein the user related information is made accessible by being displayed in a webpage modal.

7. The non-transitory computer-readable medium as recited in claim 6, wherein the user related information comprises additional links which are activatable to cause a display of a sub-type of user related information.

8. The non-transitory computer-readable medium as recited in claim 1, wherein the account ribbon is persisted across the plurality of webpages of the website in a heading section of the plural webpages.

9. The non-transitory computer-readable medium as recited in claim 1, wherein the user related information is displayed with a temporal ordering.

10. The non-transitory computer-readable medium as recited in claim 9, wherein the user related information comprises a listing of event titles.

11. The non-transitory computer-readable medium as recited in claim 9, wherein the listing of event titles are representative of events in one or more of a search channel, communications channel, and a purchasing channel.

12. The non-transitory computer-readable medium as recited in claim 11, wherein the listing of event titles are representative of events in one or more of an on-line channel and an off-line channel.

13. The non-transitory computer-readable medium as recited in claim 12, wherein the instructions capture event related metadata and the instructions provide for using a search query to include within the listing of event titles only those event titles having associated metadata which meets the search criteria.

14. The non-transitory computer-readable medium as recited in claim 12, wherein at least one event title is presented multiple times within the listing of event titles at different locations within the temporal ordering.

15. The non-transitory computer-readable medium as recited in claim 12, wherein at least one event title is presented within the listing of event titles at a location that is associated with a related event title without regard to when in time an event corresponding to the event title occurred.

16. The non-transitory computer-readable medium as recited in claim 1, wherein each of the unique links of the account ribbon is activatable in response to a mouse over event.

* * * * *